United States Patent [19]

Motegi et al.

[11] 4,226,826

[45] Oct. 7, 1980

[54] METHOD FOR MANUFACTURING POLYESTER FILMS

[75] Inventors: Masahiko Motegi, Hikone; Kazuhiro Tanaka; Saburo Fujita, both of Otsu, all of Japan

[73] Assignee: Toray Industries, Inc., Tokyo, Japan

[21] Appl. No.: 64,375

[22] Filed: Aug. 7, 1979

[30] Foreign Application Priority Data

Aug. 7, 1978 [JP] Japan .................................. 53-95415

[51] Int. Cl.$^3$ ...................... B29C 17/02; B29C 25/00
[52] U.S. Cl. .................................................. 264/235.8
[58] Field of Search .............. 264/235.8, 342 RE, 346, 264/210.2, 210.7

[56] References Cited

U.S. PATENT DOCUMENTS

| | | | |
|---|---|---|---|
| 2,884,663 | 5/1959 | Alles | 264/235.8 |
| 3,461,199 | 8/1969 | Campbell | 264/235.8 |
| 4,042,569 | 8/1977 | Bell et al. | 264/235.8 |

*Primary Examiner*—James B. Lowe
*Attorney, Agent, or Firm*—Miller & Prestia

[57] ABSTRACT

The present invention relates to a process for preparing a polyester film which has not only uniaxially enhanced mechanical properties but also biaxially enhanced mechanical properties. The process involves heat-setting a biaxially oriented polyester film at a temperature above that used for the machine and transverse direction stretching and above that used for the machine direction re-stretching, but at least 10° C. below the melting point of the polyester, then re-stretching the film in both the machine and transverse directions, and re-heat-setting the film.

8 Claims, No Drawings

METHOD FOR MANUFACTURING POLYESTER FILMS

BACKGROUND OF THE INVENTION

A biaxially oriented polyester film such as a polyethylene terephthalate (PET) film is widely utilized because of its excellent thermal and dimensional stability, good mechanical properties, etc. Biaxially oriented film is oriented machine directionally and transverse directionally, hereinafter referred to as MD and TD. Such film is very useful as the base film of magnetic tapes and condensers. The stronger the mechanical properties, the thinner the film that can be used for the magnetic tapes, condensers, and the like, with the result that the equipment which uses such tape can be made smaller and lighter, or can offer substantially higher performance if the size remains the same.

A longitudinally tensilized PET film has been used as a thin base film. The film is produced by an MD post-stretching of the ordinary biaxially oriented film. However, the MD tensilized film has the disadvantage of poor roll formation when wound as a roll film since MD wrinkles occur frequently.

Because of rapid development in the field of information technology there is a great need for a thinner base film. To fulfill this need, the thinner film must have enhanced mechanical properties in both MD and TD. A film which has stronger mechanical property only in MD is not sufficient. Ordinary biaxially oriented polyester film has a MD and TD F-5 value (a tensile strength at 5% elongation) of 10–11 kg/mm². MD tensilized film has good MD attributes, but the F-5 value in TD is only 9–11 kg/mm², so that the thinner the film becomes, the more unsuitable it is.

We have already applied for Japanese Patent No. 74-39808, wherein we proposed a method for producing a polyester film that is stronger in both MD and TD as a result of a re-stretching in TD of the longitudinally post stretched biaxially oriented polyester film. However, since the film is free in TD there remained the problem of shrinkage and neckdown in TD when the biaxially oriented film is restretched in MD on an ordinary roll system.

DETAILED DESCRIPTION OF THE INVENTION

The present invention deals with a method of producing especially strong polyester film having at least a TD value of more than 14 kg/mm² efficiency and minimal breakage during production. The outline of the present invention is that after heat-setting the biaxially oriented polyester film at a temperature above MD, TD and re-MD stretching temperature ($T_s$) but below $T_m$ (melting point of polyester) $-10°$ C., the film is re-MD stretched at a ratio of 1.05–2.5, and then re-TD stretched at a ratio of 1.05–2.5 at a temperature between 10° C. above the glass transition temperature ($T_g$) of the polyester and $T_m-40°$ C.; finally the film is heat-set at a temperature between $T_g+50°$ C. and $T_m-10°$ C. The essential element of this invention is that the biaxially oriented polyester film is heat-set before successive MD and TD re-stretching and that this minimizes the strength loss of the film while it is being stretched to allow it to be stretched efficiently, and to make a film having at least a TD F-5 value of more than 14 kg/mm². The heat-setting process before the re-stretching process strengthens the polymer orientation structure which effectively prevents the relaxation of the polymer orientation and makes it possible to efficiently produce both an MD- and TD-stronger film.

The film produced by the process of the present invention has at least a TD F-5 value of more than 14 kg/mm². The higher this F-5 value becomes, the better the roll formation when the film is wound as a roll, and the easier the handling is while making magnetic tapes or condensers from these films, and additionally, the better the qualities of the products, especially the running property of the magnetic tapes. The polyester film produced by this method has a high F-5 value, i.e. more than 15.5 kg/mm² or more than 18 kg/mm²; the superiority of film qualities such as the roll formation, etc., as compared with the ordinary films, is very apparent.

Such a high F-5 value cannot be obtained merely by simple stretching. It is obtained by meeting special conditions as described herein. Defining the first MD and TD stretching ratios of the original biaxially oriented polyester film as A and B, the second MD and TD re-stretching ratios may be defined as A' and B'. A special condition is that the products of (A×A') and (B×B') are both nearly 4.0 preferably more than 4.5, and even more preferably more than 5.0. The most preferable products are more than 5.5. The film produced by the method of this invention has a characteristic relationship that is at least $A \times A' = B \times B' = 4.0$, and most preferably $5.5 \leq A \times A' = B \times B'$. Here the biaxially oriented film for further stretching is obtained by stretching a film in MD and then in TD, or stretching a film both in MD and TD simultaneously, or stretching a film in MD, then in TD, and then MD again, etc.

In the MD-TD or TD-MD successive stretching process the substantially amorphous polyester film is stretched in one direction more than 2.0 times, preferably 2.0–6.0 times, more preferably 2.5–5.0 times at a temperature between $T_g$ and $T_g+60°$ C., preferably between $T_g+10°$ C. and $T_g+40°$ C., and then this film is stretched in the right-angled direction by more than 2.0 times, preferably 2.0–6.0 times, more preferably 2.5–5.5 times at a temperature between $T_g$ and $T_g+80°$ C., preferably between $T_g+10°$ C. and $T_g+60°$ C. In the simultaneous stretching process the substantially amorphous polyester film is simultaneously stretched in MD and TD both by more than 2.0 times, preferably 2.0–5.0 times, more preferably 2.5–4.5 times (MD/TD stretching ratio being properly determined) at a temperature between $T_g$ and $T_g+80°$ C., preferably between $T_g+10°$ C. and $T_g+60°$ C. The MD-TD successively stretched film is the most satisfactory.

As for the heat-setting treatment, the tenter system, which uses clips to hold the film is better than the roll system. The biaxially oriented film is heat-set at a temperature above MD, TD stretching temperature and $T_s$ (re-stretching temperature) but below $T_m$ (melting temperature) $-10°$ C., preferably between $T_s+5°$ C. and $T_m-20°$ C., and more preferably between $T_s+10°$ C. and $T_m-30°$ C. It is especially preferable that the heat-setting temperature be higher than the TD-re-stretching temperature. It is preferable to heat-set the film in a tense form but it is possible to heat-set it in a relaxed form if that is necessary.

The re-MD and re-TD stretching temperature is from $T_g+10°$ C. to $T_m-40°$ C. Otherwise film breakage or non-uniform stretching occurs because the film stretching property is very poor. The preferable stretching temperature is from $T_g+40°$ C. to $T_m-60°$ C., with the TD-re-stretching temperature being higher than the MD-re-stretching temperature. The MD and TD-re-stretching ratio is between 1.05 and 2.5. Re-stretching ratios are determined by the condition of the orientation of the original biaxially oriented film, but in any case if the re-stretching ratio is less than 1.05, the re-stretching effect does not appear, and if the ratio is above 2.5, film breakage occurs very frequently. The preferable re-stretching ratio is between 1.2 and 2.0. Ordinary roll stretching system and tenter stretching systems can be used for MD-re-stretching. Furthermore, it makes no difference whether the film has edges, no edges, or folded edges.

It is desirable to heat-set the re-MD-stretched film before TD-re-stretching at a temperature between MD, TD-re-stretching temperatures and $T_m-10°$ C. since this prevents the re-MD-stretched film from being relaxed during orientation.

It is better to re-heat-set by the tenter system, which uses clips to hold the film, than by the roll systems. The temperature of the re-heat-setting shall be between $T_g+50°$ C. and $T_m-10°$ C., preferably more than 10° C. above the MD, TD-re-stretching temperatures and between $T_g+80°$ C. and $T_m-20°$ C. It is preferable to re-heat-set the restretched film in a tense form, but it is possible to heat-set the film in a relaxed form in order to enhance the dimensional stability.

The polyester film produced by the above described method has good roll formation when wound as a roll since it is difficult for the MD wrinkles or other defects to appear at that time; in addition this polyester film has a strong mechanical property not only in MD but also in TD. This film is especially suitable, for example, as the base film for the long recording video tapes or condensers which require thin base films with thicknesses of less than 10 microns.

Polyethylene terephthalate or polyethylene-2,6-naphthalate is especially good for the film produced by this method. The method is also applicable to the polyester copolymers comprised of more than 70% by weight of polyethylene terephthalate, and polymer-mixtures which do not lose the polyethylene terephthalate characteristics. Desirable intrinsic viscosity is 0.5–1.0, more preferably 0.64–0.90.

The glass transition temperature is a turning point temperature of the specific volume-temperature curve obtained by the heating non-stretched film by 5° C./min in a dilatometer. The melting point ($T_m$) is the peak temperature of the melting curve obtained by DSC whose heating temperature rate is 10° C./min.

We explain the present invention further by the following Examples which are illustrative of the invention and should not be construed as limitations thereof.

EXAMPLES 1-4, CONTROL EXAMPLES 1-3

A polyethylene terephthalate melt at a temperature of 280° C. having an intrinsic viscosity of 0.70 was extruded onto a cool casting drum to form a substantially amorphous film. An intrinsic viscosity of this film was 0.68. This film was stretched in MD by 3.5 times at a temperature of 80° C. by means of the difference in the speeds of two couples of the nip rolls, then this film was stretched in TD by 3.5 times at a temperature of 100° C. in a tenter. This film was heat-set at a temperature shown in Table 1 under tension, then re-stretched in MD by 1.5 times at a temperature of 135° C. by a roll method, and then re-stretched in TD by 1.6 times at a temperature of 150° C. in a tenter. Finally it was heat-set under tension at a temperature of 200° C. The thickness of the obtained film was 5 μm.

As shown in Table 1, compared with Control Examples 1-3, by heat-setting the film above a temperature during the re-stretching process, MD relaxation of the orientation of the film is prevented during the re-stretching process. As a result, a very strong film both in MD and TD is efficiently obtained.

CONTROL EXAMPLES 4-6

Control Example 4 is an ordinary biaxially oriented film which is obtained by stretching an amorphous sheet 4.0 times its dimensions in MD at 80° C., 4.2 times its dimensions in TD at 100° C., and then heat-setting it at 200° C. As shown in Table 2, a strong mechanical property is not obtained.

Control Example 5 is a film which was obtained by stretching an amorphous sheet 5.0 times its dimensions, in both MD and TD simultaneously, at 85° C. in a tenter. Although the total film stretching ratio was less than that of Examples 1-3, film breakage occurred very frequently. The data shows that the present invention gives not only superior film, but also an easy stretching process.

Control Example 6 is an ordinary tensilized film produced by stretching a film in order of MD and TD and post stretching in MD. The difference between Example 1 and Control Example 6 is an omission of stretching in TD. The mechanical property in TD is not as great, and the roll formation is not as good.

EXAMPLES 5-9, CONTROL EXAMPLE 7

The procedure of Example 4 was repeated, except that the first MD stretching ratio was 2.5 times its dimensions, and the re-stretching ratio in MD was set as shown in Table 3. Only in Example 8 did we adopt the two-stage MD stretching process. After the cast sheet was stretched 1.5 times its dimensions in MD at 120° C., it was again stretched 2.5 times at 80° C. in MD. The properties of the films were good in all Examples. Control Example 7 shows that film breakage occurred very frequently if the re-MD-stretching ratio exceeded 2.5.

In Example 9 the same procedure as used in Example 5 was repeated except that the heat-setting process of 200° C. was set between the re-MD-stretching process and the re-TD-stretching process. Compared with Example 5 we believe that the heat-setting process results in enhanced mechanical properties of the film. A magnetic layer, consisting of γ-ferric oxide and a binder, was coated on the film in a thickness of 3.5 μm to form a magnetic recording tape.

We evaluated the running property of the magnetic tapes, which had a width of ½ inch and length of 200 meters, by playing the tape in a VTR. Evaluation is done by monitoring the normal play back condition, the unwinding and rewinding condition, and the 500 times repeated running condition. Evaluation grades are shown in the following Tables 1, 2 and 3.

TABLE 1

| | Heat-setting Temperature (°C.) | F-5 value (kg/mm²) MD | F-5 value (kg/mm²) TD | Number Film Breaks (per 9,000 m) | Roll formation | Running property |
|---|---|---|---|---|---|---|
| Control Example 1 | nothing | 13.0 | 13.1 | 0 | 0 | Δ |
| 2 | 100 | 12.8 | 13.2 | 0 | 0 | Δ |

TABLE 1-continued

| | Heat-setting Temperature (°C.) | F-5 value (kg/mm²) MD | F-5 value (kg/mm²) TD | Number Film Breaks (per 9,000 m) | Roll formation | Running property |
|---|---|---|---|---|---|---|
| 3 | 130 | 13.5 | 13.5 | 0 | 0 | Δ |
| Example | | | | | | |
| 1 | 140 | 14.4 | 14.6 | 0 | 0 | 0 |
| 2 | 160 | 16.7 | 15.8 | 0 | 0 | 0~◉ |
| 3 | 180 | 17.8 | 17.0 | 0 | 0 | 0~◉ |
| 4 | 200 | 18.3 | 18.9 | 0 | 0 | ◉ |

Evaluation grades are as follows:
◉ very good
0 good
Δ moderately poor
X very poor

TABLE 2

| | Stretching Method | F-5 value (kg/mm²) MD | F-5 value (kg/mm²) TD | Number Film Breaks (per 9,000 m) | Roll Formation | Running Property |
|---|---|---|---|---|---|---|
| Control Ex. 4 | MD-TD successive stretching | 11.8 | 12.0 | 0 | Δ | X |
| 5 | MD-TD simultaneous stretching | 14.8 | 13.9 | 11 | X (film breaks) | — |
| 6 | MD-TD-re-MD stretching | 18.0 | 9.8 | 0 | Δ | X |

Evaluation grades are as follows:
Δ moderately poor
X very poor

TABLE 3

| | Re-MD-stretching ratio | F-5 value (kg/mm²) MD | F-5 value (kg/mm²) TD | Number Film Breaks (per 9,000 m) | Roll formation |
|---|---|---|---|---|---|
| Example | | | | | |
| 5 | 1.5 | 16.5 | 18.8 | 0 | 0 |
| 6 | 2.0 | 18.3 | 18.5 | 0 | 0 |
| 7 | 2.5 | 20.1 | 18.0 | 1 | 0 |
| Control Example | | | | | |
| 7 | 3.0 | 21.1 | 17.0 | 30 | film breaks |

TABLE 3-continued

| | Re-MD-stretching ratio | F-5 value (kg/mm²) MD | F-5 value (kg/mm²) TD | Number Film Breaks (per 9,000 m) | Roll formation |
|---|---|---|---|---|---|
| Example | | | | | |
| 8 | 1.5 | 17.3 | 19.0 | 0 | 0 |
| 9 | 1.5 | 18.5 | 20.0 | 0 | 0 |

Evaluation grades are as follows:
0 good

We claim:

1. In a process for preparing a polyester film having an F-5 value in the TD which is above 14 kg/mm², the steps which comprise heat-setting a biaxially oriented polyester film obtained by stretching the film at a ratio of more than 2.0 in both the MD and TD, at a temperature above the MD-, TD-, and re-MD stretching temperature but below $T_m$ (the melting point of the polyester) $-10°$ C., then restretching the film at a ratio of 1.05–2.5 in MD and then at a ratio of 1.05–2.5 in TD at a temperature between $T_g$ (glass transition temperature of the polyester) $+10°$ C. and $T_m-40°$ C., and reheat-setting the film at a temperature between $T_g+50°$ C. and $T_m-10°$ C.

2. A process as recited in claim 1, in which the biaxially oriented polyester film is obtained by stretching the substantially amorphous polyester sheet 2.0–6.0 times in one direction at a temperature between $T_g$ and $T_g+60°$ C., and then 2.0–6.0 times in the perpendicular direction at a temperature between $T_g$ and $T_g+80°$ C.

3. A process as recited in claim 1, in which the biaxially oriented polyester film is obtained by stretching the substantially amorphous polyester sheet in both MD and TD simultaneously 2.0–5.0 times at a temperature between $T_g$ and $T_g+80°$ C.

4. A process as recited in claim 1, in which the product of the first stretching ratio and the second stretching ratio are more than 4.0 in both MD and TD.

5. A process as recited in claim 1, in which the re-TD-stretching temperature is above the re-MD-stretching temperature.

6. A process as recited in claim 1, in which the polyester is polyethylene terephthalate or polyethylene-2,6-naphthalate.

7. A process as recited in claim 6, in which the intrinsic viscosity of the polyester is 0.5–1.0.

8. A process as recited in claim 1, which further contains a step of heat-setting of the re-MD-stretched film before the re-TD-stretching process at a temperature above re-MD- and re-TD stretching temperature but below $T_m-10°$ C.

* * * * *